Feb. 4, 1964   P. L. CIACCIO   3,120,017
REEL FEED MECHANISM FOR SEWER CLEANING RODS
Filed Feb. 20, 1962   2 Sheets-Sheet 1
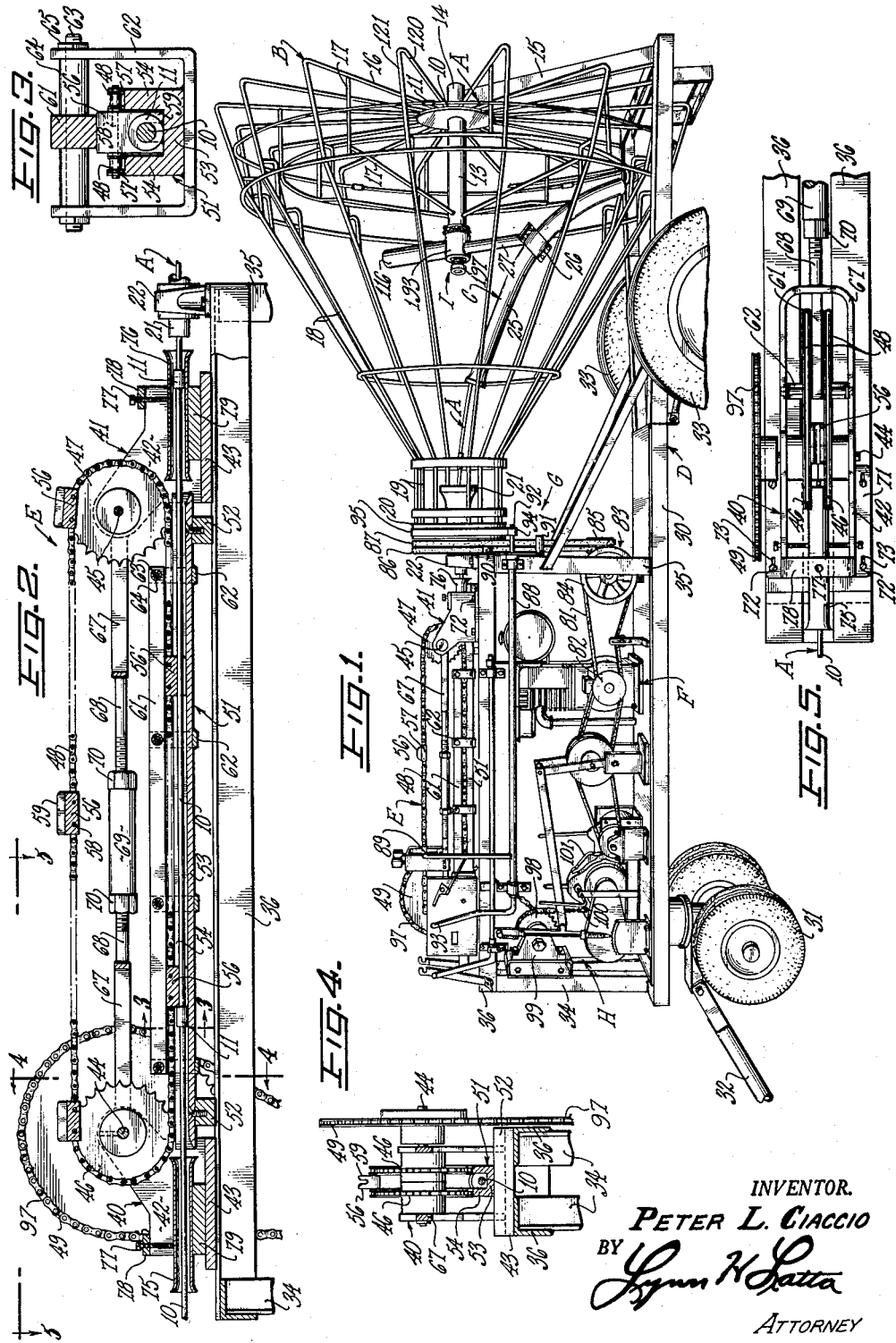
INVENTOR.
PETER L. CIACCIO
BY
*Lynn H. Latta*
ATTORNEY Feb. 4, 1964    P. L. CIACCIO    3,120,017
REEL FEED MECHANISM FOR SEWER CLEANING RODS
Filed Feb. 20, 1962    2 Sheets-Sheet 2
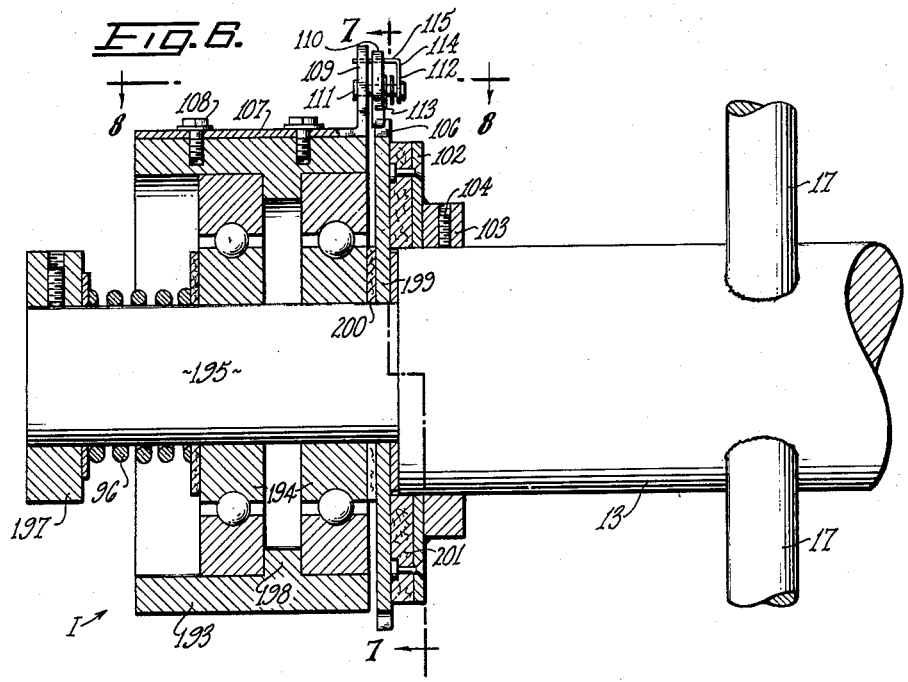
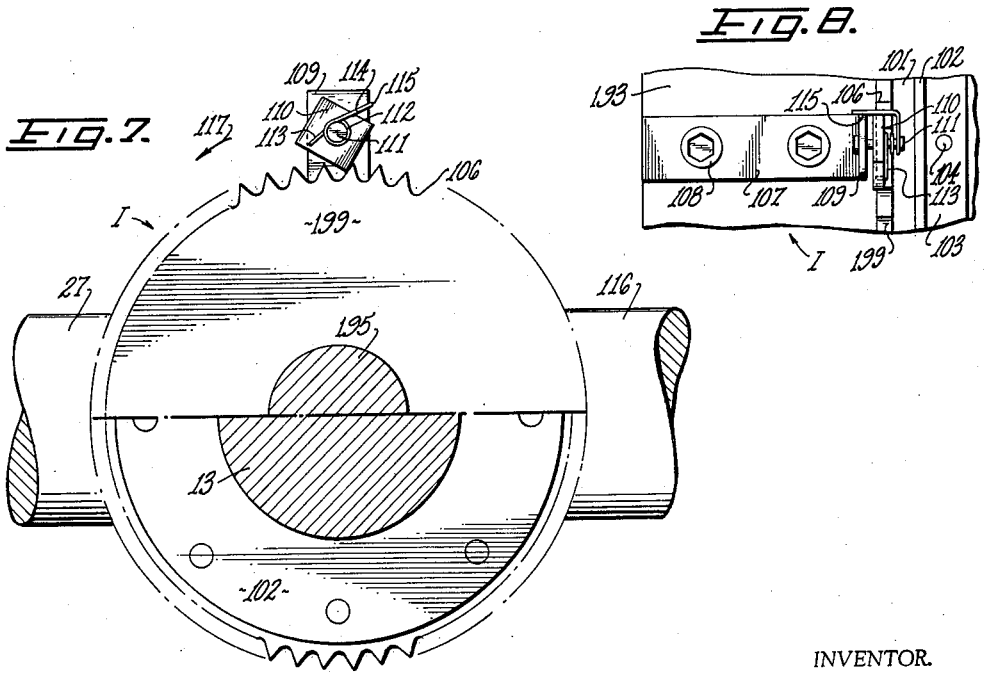
INVENTOR.
PETER L. CIACCIO
BY
Lynn W. Latta
ATTORNEY

United States Patent Office 3,120,017
Patented Feb. 4, 1964

3,120,017
REEL FEED MECHANISM FOR SEWER CLEANING RODS
Peter L. Ciaccio, West Los Angeles, Calif. (% Flexible Manufacturing Corporation, 9059 Venice Blvd., Los Angeles 34, Calif.)
Filed Feb. 20, 1962, Ser. No. 174,547
7 Claims. (Cl. 15—104.3)

This invention relates to reel feed apparatus for sewer cleaning drive rod, of the general type disclosed in my Patent No. 2,544,256, issued March 6, 1951, and has as its general object to provide improvements in that type of reel feed apparatus.

An object of the invention is to increase the sturdiness and wear-life of the rod feed mechanism of such reel feed apparatus.

Other objects will be pointed out in the ensuing specification, referring to the appended drawings, in which:

FIG. 1 is a perspective side elevational view of reel feed apparatus embodying the invention;

FIG. 2 is a detailed vertical longitudinal sectional view of the rod-feeding portion of the apparatus;

FIG. 3 is a transverse sectional view of the same taken on the line 3—3 of FIG. 2;

FIG. 4 is a transverse sectional view of the same taken on line 4—4 of FIG. 2;

FIG. 5 is a fragmentary plan view of the same taken as indicated by the line 5—5 of FIG. 2;

FIG. 6 is a longitudinal detail sectional view of my improved free-wheeling brake unit;

FIG. 7 is a transverse sectional view thereof, taken on the line 7—7 of FIG. 6; and FIG. 8 is a fragmentary plan view of the same, viewed as indicated by the line 8—8 of FIG. 6.

General Description

Referring now to the drawing in detail, and in particular to FIG. 1, illustrating the entire apparatus, I have shown therein, as an example of one form in which the invention may be embodied, a reel feed apparatus of the type disclosed in my prior Patent No. 2,544,256, wherein a jointed drive rod A is normally stored in a reel B from which it is adapted to be projected through a guide nozzle C which is mounted on the chassis D of the apparatus; and which, when rotated in the opposite direction, is adapted to draw the drive rod A into itself and to store it in coiled form, in the larger rear end area thereof. The apparatus further includes the improved rod-feeding unit E embodying the improvements of the present invention, a power plant F, a transmission G for transmitting drive from the power plant F to the reel B for rotating the same, and transmission mechanism H for transmitting drive from the power plant F to the rod feeding unit E. Each of the transmissions G and H include reversing means and start-stop control means which will be described hereinafter.

An improved rotary joint I, details of which are shown in FIGS. 6-8, connects the guide nozzle C to the reel B for free-wheeling rotation in one direction and frictionally retarded rotation in the other direction with respect to the reel.

Detailed Description

Drive rod A (FIG. 2) comprises a series of drive rod sections 10 and a series of internally threaded couplings 11 into which the ends of the rod sections 10 are threaded so as to join them together in a continuous jointed rod for entering into a sewer and for driving a sewer cleaning tool attached to the forward end thereof. The couplings 11 also constitute feed elements which are engaged by the rod feeding mechanism E for longitudinally feeding the drive rod forwardly into a sewer as it is being unreeled from the reel B or withdrawing it from the sewer and feeding it back into the reel B, as the cleaning operation may require.

Reel B comprises a hub 13 which is rotatably mounted upon a shaft 14 the rear end of which is rigidly supported by the top of an A-frame 15 at the rear end of chassis D. The cage structure of reel B includes a back spider 16 consisting of an array of spokes radiating from the hub 13, a corresponding circumferential array of L-bars 17 consisting of horizontal arms each secured to a respective spoke 16 and a radial arm secured to the hub 13, the horizontal arms collectively providing an annular shoulder spaced radially inwardly from the periphery of the reel and upon which the drive rod is coiled. The cage structure of the reel further includes diagonal bars 18 converging forwardly from the outer ends of spokes 16, to a cylindrical neck portion 19 of the reel, and is provided at its forward end with a combined brake drum and drive pulley 20, through which the reel is rotatably driven and stopped as required. Mounted in the center of neck portion 19 is a guide throat 21 through which the drive rod passes to and from the feed unit E. The forward end cap of reel B is rotatably supported by extension of the forward end of guide throat 21 (functioning as a trunnion) through a pillow block bearing 22 mounted upon a chassis D.

Guide nozzle C comprises the spirally curved tube 25 having a forward end which approaches tangency to the major longtiudinal axis of the apparatus, along which the drive rod is moved by the feed unit E, and having a rearward end which approaches tangency to the circumferential orifice through which the drive rod leaves and returns into the reeling space, defined by the L-rods 17 and rear ends of the diagonal bars 18. The intermediate portion of guide nozzle 25 is secured by a clamp 26 to a radial support arm 27 which is mounted on the forward end of shaft 14. The nozzle C guides the rod A in a spiral path between the feed axis upon which the reel B rotates and the circumference upon which the rod is reeled.

Chassis D comprises a bed 30 supported at its forward end upon a steerable truck 31 having a draft tongue 32 for hitching the apparatus to a tractor vehicle, and upon rear wheels 33. The chassis further includes a forward upright 34, a mid-section upright 35, and a longitudinally extending horizontal bridge beam 36 supported at its respective ends upon the uprights 34 and 35.

Rod-feeding unit E comprises saddle brackets 40 and 41, each of which is of U-section transversely, embodying laterally spaced arms 42 extending upwardly from a base web 43 which is secured to beam 36; a pair of sprocket shafts 44, 45 rotatably mounted in the arms 42 of respective brackets 40, 41; a pair of sprockets 46 and 47 mounted on the respective shafts 44, 45; and a pair of feed chains 48 trained around the respective pairs of sprockets, each chain extending between a sprocket 46 and a sprocket 47. Secured to a projecting end of shaft 44 in a larger sprocket 49 which receives drive from the transmission mechanism H.

A guide channel 51 is disposed above the bridge beam 36 in spaced parallel relation thereto and is mounted thereon by abutment blocks 52. Guide channel 51 (FIG. 3) comprises a horizontal bottom web 53 and upwardly extending rails 54 which are symmetrically spaced laterally on respective sides of the longitudinal feed axis so that the drive rod A may feed between them. The rails 54 have smooth, flat horizontal upper faces functioning as ways upon which the lower stretches of the chains 48 are slidably supported against sagging.

Secured between the chains 48, at positions equally spaced along the length of the chains, are an odd number of feed yokes 56 each consisting of a rectangular block embraced between an opposed pair of mounting links 57 in the chain, and secured thereto by the chain pintles 58 which extend through and bridge between respective opposed pairs of links 57. Each feed yoke 56 has its outer side longitudinally grooved to provide a pair of laterally spaced jaws 59 which are adapted to embrace a drive rod section 10 and to establish driving engagement against an end of a coupling 11 as illustrated in FIGS. 2 and 3. The jaws 59 may be dimensioned as to height so as to have their longitudinal marginal faces ride against the bottom web 53 of guide channel 51 to partially relieve the dragging engagement of the chains 48 against the rails 54.

An important feature of the invention is the spacing of the feed yokes 56 from one another a distance equal to one-half the spacing between couplings 11 on drive rod A and the correlation of such spacing with the spacing between sprockets 46 and 47, such than an odd number of the feed yokes 56 is utilized. Thus successive drive rods couplings 11 are engaged by alternate feed yokes rather than by successive feed yokes. Between the alternate yokes which are transmitting feed to the drive rod, an intervening yoke (e.g. the one shown at position 56' in FIG. 2) will be idle except for such support as it may provide in riding against the bottom web 53 of the guide channel 51 (which function is an optional one and may or may not be utilized to supplement the supporting action of the chains 48 riding against the upper faces of rails 54). Since there are an odd number of the feed yokes 56, any given yoke will drive only once in two circuits of travel around the sprockets, and the wear against its feed jaws 59 will be only one-half as much as if the yoke were required to drive during every circuit around the sprockets. For a given length of chain, there are twice as many feed yokes as there would be if each yoke were to drive during every circuit, and the wear is cut in half by being distributed among the doubled number of yokes.

A hold-down bar 61 is disposed above the trough of guide channel 51 in parallel relation to the channel and is mounted thereto by brackets 62 of rectangular U-form having horizontal bottom webs welded to the underface of guide channel 51 and upstanding arms which are bridged by tie rods 63 extending through spaced bores in the hold-down bar 61. Spacer sleeves 64 are interposed between the respective sides of hold-down bar 61 and the respective arms of brackets 62, for positioning the bar 61 over the trough of guide channel 51. Both ends of each tie rod 63 are threaded and are secured by nuts 65 tightened against the respective arms of a respective bracket 62.

The hold down bar 61 has a secondary function of cooperating with bracket 62 to provide a truss construction which rigidifies and adds vertical support to the central portion of guide channel 51, resisting sagging thereof.

Chain-tightening is provided for by tightener units each comprising halters 67 secured to and projecting toward one another in aligned relation from respective bracket arm 42 of the sprocket brackets 40, 41; aligned threaded stems 68 secured to and projecting toward one another from the respective halters 67; and an internally threaded turnbuckle sleeve 69 into which the stem 68 are threaded with right and left hand threads, and to which they are locked by respective lock-nuts 70. Brackets 40 and 41 have respective laterally extending flanges 71 (FIG. 5) which are securedt to bridge beam 36 by bolts 72 extending through slots 73 therein to accommodate longitudinal adjustment of at least one of the brackets 40, 41 upon the bridge beam 36 in response to operation of the turnbuckle adjusting unit 67—70.

Mounted in the respective brackets 40, 41 in alignment with the guide channel 51, at the respective ends thereof, are respective guide barrels 75, 76 having belled ends for reception of the couplings 11. The barrels 75, 76 are secured by clamp screws 77 threaded through cross webs 78 bridging and bracing the arms 42 of the respective brackets. Height positioning of barrels 75, 76 may be provided for by shim blocks 79 inserted between the barrels and the bottom webs 43 of the brackets 40, 41.

The rear barrel 76 is in adjacent aligned relation to the forward end of guide throat 21 of the reel unit B.

Rotary joint I (FIGS. 6–8) comprises a ratchet collar 193 journalled, through the medium of antifriction bearings 194, on a trunnion 195 integral with and projecting axially forwardly from the end of hub 13; a coil spring 96 engaged under compression between an abutment collar 197, secured to the forward end of shaft 96, and the inward race of the forward bearing 94 and spring-loading the forward bearing; an integral spacer rib 198 within collar 193, engaged between the bearings 194 and transmitting the spring load from the forward bearing to the rear bearing; a brake plate 199 (a flat metal ring) receiving the spring load from the inner race of the rear bearing through an interposed washer 200 which may be of graphite-impregnated asbestos or other solid lubricant bearing material; a brake disc 201 of brake-lining material and of flat ring form, mounted on a back-up ring 102; and a suitable mounting securing the back-up plate 102 to the hub 13 (e.g. a collar 103 secured to hub 13 by set screw 104 and having the back-up plate 102 welded to its forward face).

In addition, the unit I includes a ratcheting one-way drive connection between the ratchet collar 193 and the brake plate 199, comprising peripheral ratchet teeth 106 on the brake plate 199, an angle bracket 107 secured, as by cap screws 108, to the periphery of collar 193 in a position extending parallel to its axis, and having a radial arm 109 disposed in the plane of the rear end of collar 193; a pawl 110 (which may be a rectangular block of plate metal) pivoted on a pintle 111 secured in the arm 109 and projecting axially over the toothed periphery of brake plate 199; a torsion spring 112 having an arm 113 secured at its end to the pawl 110 (as by having a tip bent at right angles and engaged in a small bore in the pawl 110 as indicated in dotted lines in FIG. 6); and an arm 114 terminating in a finger 115 bent to extend parallel to pintle 111 and engaged against one side of bracket arm 109.

Arm 27 of guide nozzle C is secured in one side of ratchet collar 193, and a counter-weight 116 is secured in the diametrically opposite side of the collar.

At this point it may be noted (looking forwardly from behind the reel B toward the feeding unit E as in FIG. 7), that the guide nozzle C and the parts to which it is attached, including the bracket arm 109 and pawl 110, may rotate freely in the counter-clockwise direction as indicated by arrow 117 of FIG. 7; whereas upon rotation in the opposite direction, the bracket arm 109 will move pawl 110 into driving engagement with the nearest ratchet teeth 106 of brake plate 199 and will force the latter to rotate in frictional bearing engagement with the brake facing 101, whereby a constant drag will be imposed upon the orbiting movement of the guide nozzle C. During free-wheeling rotation, the pawl 110 will ratchet over the teeth 106, leaving the brake plate 199 frictionally adhering to the brake facing 101 and the collar 193 rotating freely on the antifriction bearing 194 with substantially negligible resistance involved in the ratcheting movement.

Transmission G comprises a drive belt 81 receiving drive from a pulley cluster 82 on the crank shaft of power plant F and driving a Boston gear unit 83 which has an output shaft at right angles to its input pulley 84 which receives the drive from belt 81; a pulley cluster 85 on said output shaft, driving a pair of belts 86, 87 for forward and reverse drive respectively, and a belt tightener unit comprising a tubular shaft 88 journalled in bearings carried by the mid-way upright 35 and by a bracket on bridge beam 36 respectively, shaft 88 having an operating crank lever 89 at one end and a bell crank lever carrying respective belt tightener rollers 90 and 91 at its other end.

The belt tightener unit further includes a shaft 92 extending through tubular shaft 88, a crank handle 93 on one end of shaft 92, for rotating it, and an actuator device 94 on the other end of shaft 92, for operating a device 95 which can be a brake band in accordance with construction of this description which is known in the art.

Transmission mechanism H comprises a chain 97 transmitting drive from a sprocket cluster 98 rotatably mounted on a bracket 99 on frame upright 34, and a chain 100 transmitting drive from a transmission unit 101 driven by pulley cluster 82 of power plant F through the controllable belt drive mechanism shown in FIG. 1, in accordance with known construction.

By selectively operating either belt tightener roller 90 or 91 respective forward or reverse drive is applied.

*Operation*

In the operation of the feed unit E, the drive rod A is guided into and out of channel 51 (in either direction) by the guide barrels 75, 76. As a drive rod coupling 11 enters the guide channel 51, it will be engaged by feed yoke 56 entering the guide channel 51, and will be driven thereby as it slides in the channel. Upward disengagement of the driving feed yoke will be prevented by the sliding engagement of its upper face against the lower bearing face of hold down bar 61. The lower stretches of chains 48 will be supported against sagging by riding upon the upper bearing faces of rails 54. Such support may optionally be supplemented by the riding of the lower faces of feed yoke jaws 59 against the bottom web of guide channel 51. The next feed yoke to enter the channel will establish embracing, non-driving engagement with the drive rod section at a position midway between couplings 11. However, after travelling around the sprocket and having again entered the guide channel 51, this feed yoke will establish driving engagement with the drive rod while the preceding and following yokes will travel through the guide channel without establishing driving engagement with the drive rod. Thus each feed yoke executes a working pass in each alternate circuit of the sprockets and an idling pass in each intervening circuit.

In the operation of the improved reel and guide nozzle units B, C and I, when the guide rod A is being fed forwardly into a sewer, the outer end of nozzle 25 will follow the orbiting point of withdrawal of the guide rod from the storage space of reel B, orbiting in a counter-clockwise direction as viewed from behind the reel B looking forwardly. Such counterclockwise orbital movement is substantially unopposed by the rotary joint I, which provides for free-wheeling rotation in that direction. On the other hand when the guide rod is being driven back into the reel B by reverse operation of feeding unit E, the guide nozzle C would be required to orbit in the clockwise direction as viewed from the rear, and the friction braking portion of unit I then becomes operative to yielding resist such clockwise orbital movement. Consequently, the angular rate of orbiting movement will be restrained to a minimum and the drive rod, as it is pushed out of the outer end of nozzle 25, will seek the most remote area in the storage space within the reel B, i.e. the corners 120 defined between the radial spokes 16 and the peripheral bars 121 of the reel, and will be laid in coils against the peripheral bars 121, beginning at the rear extremities thereof and advancing forwardly. Conversely, when the drive is again being withdrawn from the reel, it will be released smoothly, without interference, from the inside of the coil of rod contained in the reel, and will not become jammed in the reel.

I claim:

1. In an apparatus for feeding a sewer-cleaning drive rod embodying rod sections joined by spaced couplings; a guide channel of U-section including a bottom web and side rails projecting upwardly therefrom and having flat upper bearing faces disposed in a common horizontal plane; a pair of laterally spaced feed chains having lower stretches riding on said bearing faces; two pairs of laterally spaced sprockets disposed near respective ends of said guide channel; said feed chains being trained around said sprockets; means for transmitting drive to at least one pair of said sprockets; a plurality of feed yokes secured between said chains in positions equally spaced along the length thereof; each yoke embodying a pair of laterally spaced jaws adapted to embrace a feed rod section, to enter said guide channel and to engage a drive rod coupling for feeding the rod through the guide channel; a hold-down bar disposed above, and parallel to said channel in a position for sliding engagement of the back faces of said feed yokes against its lower surface to confine said yokes against upward displacement and to thereby maintain secure feeding engagement with the drive rod couplings; said feed yokes being spaced apart a distance half the distance between consecutive feed rod couplings so that only alternate yokes will engage successive couplings; said feed yokes being odd in number so that each yoke will make a working pass once in each alternate circuit of said sprockets and will make an idling pass in each intervening circuit.

2. In an apparatus for feeding a sewer-cleaning drive rod embodying rod sections joined by spaced couplings; a guide channel of U-section including a bottom web and side rails projecting upwardly therefrom; a pair of laterally spaced feed chains; two pairs of laterally spaced sprockets disposed near respective ends of said guide channel, said feed chains being trained around said sprockets; means for transmitting drive to at least one pair of said sprockets; a plurality of feed yokes secured between said chains in positions equally spaced along the length thereof; said chains having lower stretches positioned for moving said blocks through said channel, and each yoke embodying a pair of laterally spaced jaws adapted to embrace a drive rod section, to enter said guide channel, and to engage a drive rod coupling for feeding the rod through the guide channel; a hold-down bar disposed above, and parallel to said channel in a position for sliding engagement of the back faces of said feed yokes against its lower surface to confine said yokes against upward displacement and to thereby maintain secure feeding engagement with the drive rod couplings; a plurality of mounting brackets secured to said guide channel in positions spaced along the length thereof and projecting upwardly from respective sides thereof in embracing relation to said hold-down bar; said feed yokes being spaced apart a distance half the distance between consecutive drive rod couplings so that only alternate yokes will engage successive couplings, and being odd in number so that each yoke will make a working pass once in each alternate circuit of said sprockets and will make an idling pass in each intervening circuit.

3. In an apparatus for feeding a sewer-cleaning drive rod embodying rod sections joined by spaced couplings; a guide channel of U-section including a bottom web and side rails projecting upwardly therefrom and having flat upper bearing faces disposed in a common horizontal plane; a pair of laterally spaced feed chains having lower stretches riding on said bearing faces; two pairs of laterally spaced sprockets disposed near respective ends of said guide channel; said feed chains being trained around said sprockets; means for transmitting drive to at least one pair of said sprockets; a plurality of feed yokes secured between said chains in positions equally spaced along the length thereof, each yoke embodying a pair of laterally spaced jaws adapted to embrace a drive rod section, to enter said guide channel, and to engage a drive rod coupling for feeding the rod through the guide channel; a hold-down bar disposed above, and parallel to said channel in a position for sliding engagement of the back faces of said feed yokes against its lower surface to confine said yokes against upward displacement and to thereby maintain secure feeding engagement with the drive rod couplings; a plurality of mounting brackets secured to said guide channel in positions spaced along the length thereof and projecting upwardly from respective sides thereof in embracing relation to said hold-down bar and having respective transverse tie links supporting said hold-down bar; said feed yokes being spaced apart a distance half the distance between consecutive drive rod couplings so that only alternate yokes will engage successive couplings, and being odd in number so that each yoke will make a working pass once in each alternate circuit of said sprockets and will make an idling pass in each intervening circuit.

4. In an apparatus for feeding a sewer-cleaning drive rod embodying rod sections joined by spaced couplings; a guide channel of U-section including a bottom web and side rails projecting upwardly therefrom and having flat upper bearing faces disposed in a common horizontal plane; a pair of laterally spaced feed chains having lower stretches riding on said bearing faces; two pairs of laterally spaced sprockets disposed near respective ends of said guide channel; said feed chains being trained around said sprockets; means for transmitting drive to at least one pair of said sprockets; a plurality of feed yokes secured between said chains in positions equally spaced along the length thereof, each yoke embodying a pair of laterally spaced jaws adapted to embrace a drive rod section, to enter said guide channel and to engage a drive rod coupling for feeding the rod through the guide channel; a hold-down bar disposed above, and parallel to said channel in a position for sliding engagement of the back faces of said feed yokes against its lower surface to confine said yokes against upward displacement and to thereby maintain secure feeding engagement with the drive rod couplings; and a plurality of mounting brackets secured to said guide channel in positions spaced along the length thereof and projecting upwardly from respective sides thereof in embracing relation to said hold-down bar and having respective transverse tie links supporting said hold-down bar.

5. In an apparatus for feeding a sewer-cleaning drive rod embodying rod sections joined by spaced couplings; a guide channel of U-section including a bottom web and side rails projecting upwardly therefrom; a pair of laterally spaced feed chains; two pairs of laterally spaced sprockets disposed near respective ends of said guide channel; said feed chains being trained around said sprockets; means for transmitting drive to at least one pair of said sprockets; a plurality of feed yokes secured between said chains in positions equally spaced along the length thereof, said chains having lower stretches positioned for moving said blocks through said channel, and each yoke embodying a pair of laterally spaced jaws adapted to embrace a drive rod section, to enter said guide channel and to engage a drive rod coupling for feeding the rod through the guide channel; a hold-down bar disposed above, and parallel to said channel in a position for sliding engagement of the back faces of said feed yokes against its lower surface to confine said yokes against upward displacement and to thereby maintain secure feeding engagement with the drive rod couplings; said feed yokes being spaced apart a distance half the distance between consecutive drive rod couplings so that only alternate yokes will engage successive couplings; said feed yokes being odd in number so that each yoke will make a working pass once in each alternate circuit of said sprockets and will make an idling pass in each intervening circuit.

6. In an apparatus for feeding a sewer-cleaning drive rod embodying rod sections joined by spaced couplings; a guide channel of U-section including a bottom web and side rails projecting upwardly therefrom; a pair of laterally spaced feed chains; two pairs of laterally spaced sprockets disposed near respective ends of said guide channel; said feed chains being trained around said sprockets; means for transmitting drive to at least one pair of said sprockets; a plurality of feed yokes secured between said chains in positions equally spaced along the length thereof, said chains having lower stretches positioned for moving said blocks through said channel, and each yoke embodying a pair of laterally spaced jaws adapted to embrace a drive rod section, to enter said guide channel, and to engage a drive rod coupling for feeding the rod through the guide channel; a hold-down bar disposed above, and parallel to said channel in a position for sliding engagement of the back faces of said feed yokes against its lower surface to confine said yokes against upward displacement and to thereby maintain secure feeding engagement with the drive rod couplings; and a plurality of mounting brackets secured to said guide channel in positions spaced along the length thereof and projecting upwardly from respective sides thereof in embracing relation to said hold-down bar and secured thereto for maintaining said hold-down bar and guide channel in fixed spacing and parallel relation.

7. In an apparatus for feeding a sewer-cleaning drive rod embodying rod sections joined by spaced couplings; a guide channel of U-section including a bottom web and side rails projecting upwardly therefrom; a pair of laterally spaced feed chains; two pairs of laterally spaced sprockets disposed near respective ends of said guide channel; said feed chains being trained around said sprockets; means for transmitting drive to at least one pair of said sprockets; a plurality of feed yokes secured between said chains in positions equally spaced along the length thereof, said chains having lower stretches positioned for moving said blocks through said channel, and each yoke embodying a pair of laterally spaced jaws adapted to embrace a drive rod section, to enter said guide channel, and to engage a drive rod coupling for feeding the rod through the guide channel; a hold-down bar disposed above, and parallel to said channel in a position for sliding engagement of the back faces of said feed yokes against its lower surface to confine said yokes against upward displacement and to thereby maintain secure feeding engagement with the drive rod couplings; and a plurality of mounting brackets secured to said guide channel in positions spaced along the length thereof, projecting upwardly therefrom, and secured to said hold-down bar to maintain said hold-down bar and channel in parallelism and fixed spacing.

References Cited in the file of this patent

UNITED STATES PATENTS

| | | |
|---|---|---|
| 2,111,527 | Blanc | Mar. 15, 1938 |
| 2,383,843 | Blanc | Aug. 28, 1945 |
| 2,544,256 | Ciaccio | Mar. 6, 1951 |
| 3,039,715 | Caperton | June 19, 1962 |